July 17, 1962 K. H. MINDERMANN 3,045,074

AMPLIFIER FOR TRANSMISSION OF SPEECH IN TWO DIRECTIONS

Filed May 22, 1959

2 Sheets-Sheet 1

INVENTOR

Kurt Henry Mindermann by Wenderoth, Lind & Ponack

Attorneys

July 17, 1962 K. H. MINDERMANN 3,045,074

AMPLIFIER FOR TRANSMISSION OF SPEECH IN TWO DIRECTIONS

Filed May 22, 1959 2 Sheets-Sheet 2

INVENTOR

Kurt Henry Mindermann by Wenderoth, Lind & Ponack

Attorneys

United States Patent Office 3,045,074

Patented July 17, 1962

3,045,074

AMPLIFIER FOR TRANSMISSION OF SPEECH IN TWO DIRECTIONS

Kurt Henry Mindermann, Stockholm, Sweden, assignor to Aktiebolaget Gylling & Co., Stockholm-Grondal, Sweden Filed May 22, 1959, Ser. No. 815,003
Claims priority, application Sweden June 25, 1958
6 Claims. (Cl. 179—170)

Figure 1:
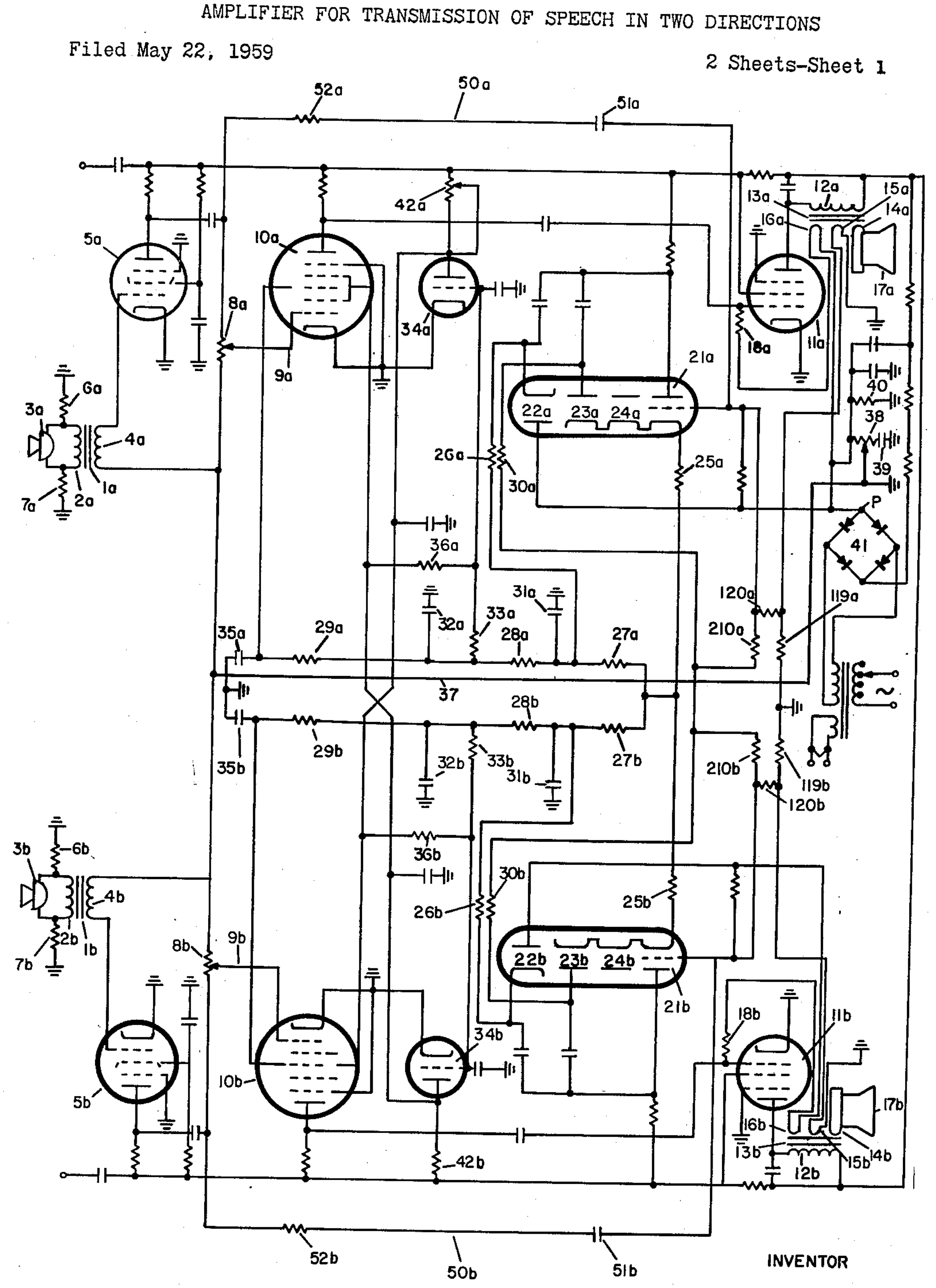

Amplifiers for transmission of speech in two directions are used for, among other things, loudspeaking telephone systems, in which each station is provided with a microphone and a loudspeaker. Such amplifiers usually have two channels, one for each direction. The construction is usually such, that when transmission is going on in one direction, said channel automatically is held open and the other channel closed. In rest condition, that is, when no signal voltages above a certain level appear in any of the channels, the amplification in the channels is usually suppressed to a certain degree. The remaining amplification determines minimum allowable distance between microphone and loudspeaker at each station. When the distance between microphone and loudspeaker is small, the suppression of the amplification must be considerable for avoiding acoustic feed-back.

If the microphone and the loudspeaker are placed very close to each other, for example if they are built-in in the same casing, the suppression of the amplification has to be very effective, so that sound, which the microphone of one of the stations is exposed to, will not be reproduced with any appreciable audibility in the loudspeaker at the other station.

An audible transmission of intelligence will occur only when the control process has started, so that one channel is open and the other channel substantially closed. It is, therefore, of greatest importance, that the control process is rapid, so that the smallest possible part of the word first spoken, is lost. It is, however, very difficult to construct an amplifier with a control process of such rapidity that reasonable requirements for a distinct speech transmission are fulfilled. This is particularly difficult when a word begins with a consonant with low energy content. The control process will start only when the next vowel comes, and the consonant will be lost.

An object of the present invention is an amplifier for speech transmission in two directions, by which those drawbacks are considerably reduced and which, in addition, has a number of other advantages.

The amplifier according to the invention has two oppositely directed channels, and an automatically operating control device, which in dependence of the speech direction keeps one of the channels open and the other channel substantially closed, said control device comprising at least one amplifier stage in each channel, which is is controlled by control voltages, said control voltages being produced by the rectification of signal voltage components derived from the signal which is amplified. The arrangement is such, that when signal voltages pass one channel, the produced control voltages tend to increase the amplification in the same channel and decrease the amplification in the other channel. The invention is characterized therein, that the signal voltages from which the control voltages are produced, are derived from at least two points in each transmission system, of which one point is located before and the other after the controlled amplifier stage.

The amplifier is suitably designed in such a way, that the signal voltages derived from the two points of each amplifier channel, have such amplitudes relative to each other, that at maximum amplification, at least one quarter and a maximum three quarters of the control voltage is produced of the signal voltage component, which is derived from the point before the controlled amplifier stage.

Still better control conditions can be obtained, if the two controlled stages of each channel form a toggle circuit together, which toggle circuit in one of its stable states of equilibrium keeps one of the channels open and the other substantially closed, and in the other equilibrium state keeps the first mentioned channel closed and the other channel open, and is adapted to be adjusted to the proper state in dependence of the control voltages which are applied to the toggle circuit.

In this construction it will be advantageous to arrange the toggle circuit in such a way, that in rest condition, that is when no signal voltages appear in any one of the amplifier channels, the toggle circuit is fed with operating voltages of such magnitude, that it has a neutral state between its two states of equilibrium, and, when signal voltages appear in any one of the channels, by the influence of the produced control voltages, it is fed with operating voltages of such magnitude, that conditions for the appearance of two pronounced states of equilibrium are established.

It is also suitable to arrange the toggle circuit in such a way, that it is capable to make elastical deviations beyond its equilibrium states in dependence of the control voltages that are applied to it.

An amplifier according to the invention possesses such controlling properties, that the amplification in the different channels is automatically adjusted to such conditions, that self-oscillations, due to acoustic feed-back, always will be avoided. If, from the start, the amplification in the two channels of the amplifier is adjusted in such a way with respect to the distance between the microphone and the loudspeaker at the stations taking part in the conversation, that the conditions precedent for the occurrence of self-oscillation due to acoustic feed-back exist, a small pulse somewhere in the circuit is required for starting the self-oscillation. If such a pulse appears in any one of the channels, produced for example by a sound wave striking one of the microphones, signal voltages will appear in that channel. This results in an increase of the amplification in this channel and a decrease of the amplification in the other channel. This function is, however, not sufficient to prevent self-oscillations due to acoustic feed-back if loudspeaker and microphone at each station are very close to each other. But the sound, which is produced by the loudspeaker of the channel with increased amplification strikes the microphone of the channel, the amplification of which is decreased. As, according to the invention, an appreciable part of the control voltage is derived from a point before the controlled stage of the channel, there will be produced a control voltage in the channel with the decreased amplification, which voltage tends to cancel the suppression of said channel and to suppress the amplification of the other channel. This does not result in any appreciable increase of the amplification in the suppressed channel, but in a remarkable decrease of the amplification in the channel, the amplification of which has been increased. This results in that the condition for self-oscillations due to acoustical feed-back immediately ceases to exist.

Another result of this arrangement is, also that the tendency for self-oscillations in only one channel of the amplifier, due to acoustic feed-back, is very much reduced. If not only the loudspeaker of one channel is positioned close to the microphone of the other channel, but also the two units, each consisting of a microphone and a loudspeaker, are located near each other, for example in the same room, self-oscillations can start even during a conversation, when one of the channels is totally blocked, due to acoustic feed-back of sound waves from the loudspeaker of the open channel to the microphone of the same channel.

When this process is started by an amplifier according to the invention, the sound from the loudspeaker of the open channel will, however, strike the microphone of the closed channel with greater force than it strikes the microphone of the open channel. A control voltage will then be produced in the closed channel. This control voltage is not sufficient to cancel the blocking of the closed channel, but it is sufficient to appreciably decrease the amplification in the open channel. The tendency for self-oscillation will thus be neutralized before the self-oscillation has started.

Still another advantage is obtained with the amplifier according to the invention, consisting in an automatic compression of the transmitted sound. This is due to the fact that the sound, which strikes the microphone of the closed channel from the loudspeaker of the open channel, gives rise to a control voltage from the closed channel, which decreases the amplification in the open channel.

The provision of a toggle circuit, which at rest has a neutral intermediate state and in operation occupies one of two outer states of equilibrium each of which being elastic, so that further displacement of the currents and the voltages of the circuit beyond the values, which are characteristic for the equilibrium states is possible, leads to the advantage, that the control process will be more rapid. This is due to the fact that the operation of the toggle circuit, is, in itself, very rapid and that the switching of the toggle circuit from a neutral state to one of the outer equilibrium states may take place more rapidly and at a lower control voltage than the switching from one of the outer equilibrium states to the other.

The invention will now be described with reference to the accompanying drawing, in which FIG. 1 illustrates a circuit diagram for an amplifier according to the invention, and FIGS. 2 to 4, inclusive, diagrammatically illustrate parts of the circuit according to other embodiments of the invention.

The amplifier shown in FIG. 1 of the drawing comprises two identical channels. The components belonging to the channels have been provided with reference characters, which characters for one of the channels have been provided with an index *a* and for the other channel with an index *b*. In the following description reference will be had only to the digital character without index, with exception for the cases, where a more precise statement is necessary, for example where the interaction between components of different channels is described.

Each channel comprises an input transformer 1 with a primary winding 2, to which a microphone 3 is connected. The transformer 1 has a secondary winding 4, which is connected to the control grid of a first amplifier valve 5. The primary winding 2 is balanced with respect to ground by means of two equal resistors 6 and 7.

From the anode of the valve 5, the signal voltage is supplied to a potentiometer 8. This potentiometer serves as a volume control. From the wiper 9 of the potentiometer 8 the signal voltage is supplied to the control grid of a second amplifier valve 10. From the anode of the last mentioned amplifier valve the signal voltage is supplied to a third amplifier valve 11, which serves as a power amplifier.

The anode of the valve 11 is connected to the primary winding 12 of a transformer 13, which has three secondary windings 14, 15, and 16. A loudspeaker 17 is connected to the secondary winding 14. One end of the secondary winding 16 is connected to a point P with fixed potential, which is approximately 8 volts negative with respect to ground, and the other end is connected to a grid leak 18 of the valve 11. By means of this arrangement a negative feed-back is introduced in the valve 11, for the purpose of matching the frequency response curve of the amplifier and for reducing the distortion.

One end of the secondary winding 15 is connected to ground and the other to a resistor 119 of the order of 470K ohms. The opposite end of said resistor is connected to a grounded point. From the junction between the secondary winding 15 and the resistor 119, the signal voltage is fed through a resistor 120 of the order of 1.5 megohms to the control grid in a triode system comprised in a valve 21. In addition to said triode system, the valve 21 comprises three diode systems 22, 23, and 24, of which two, 22 and 23 are used in this connection.

From the anode of the triode valve 21 the amplified signal voltage is supplied through a capacitor of 15,000 $\mu\mu$f. to the cathode of the diode system 22 and to the anode of the diode system 23. The anode of the diode system 22 is connected to the point P and the cathode of the diode system 23 is connected to the cathode of the triode system 21 and, through a resistor 25 of the order of 680 ohms, to the point P.

From the cathode of the diode system **22*a* in one of the channels, a rectified control voltage is taken out which is supplied to a point A through a high-resistive resistor 26*a*. The point A belongs to a filter chain comprising three high-resistive resistors 27*a*, 28*a*, and 29*a*, of the order of 470K ohms each. To the same point A to which the cathode of the diode system 22*a* in one of the channels is connected, the anode of the diode system 23*b* in the other channel is connected through a high resistive resistor 30*b***.

The anode of the diode system **23*a* in the first mentioned channel is connected to a point B through a high-resistive resistor 30*a*. The point B belongs to another filter chain comprising three high-resistive resistors 27*b*, 28*b*, and 29*b*, each of the order of 470K ohms. The cathode of the diode system 22*b* in said other channel is connected to the same point B through a high-resistive resistor 26*b*. Each of the resistors 26*a*, 26*b*, 30*a*, and 30*b*** is of the order of 470K ohms.

In the points A and B the resistors 27 and 28 of each filter chain are connected together. The other end of each resistor 27 is connected to the point P. Each junction between two adjacent resistors in each filter chain is connected to ground through capacitors 31 and 32 of the order of 10,000 and 5000 $\mu\mu$f., respectively.

Further, in each filter chain, the junction between the resistors 28 and 29 is connected to the control grid of the triode valve 34, through a high-resistive resistor 33 of the order of 390K ohms. The valve 34 can be enclosed in the same bulb as the valve 10. The other end of the resistor 29 is connected to a second control grid of the valve 10 and further through a capacitor 35 of the order of 0.05$\mu$f. to ground.

The anode of the triode valve **34*a* of one channel is directly connected to the screen grid of the valve 10*b* of the other channel, and, correspondingly, the anode of the valve 34*b* of the last mentioned channel is directly connected to the screen grid of the valve 10*a*** in the first mentioned channel.

Further, the control grid of the valve **34*a* of one channel is connected to the anode of the valve 34*b* of the other channel through a high-resistive resistor 36*a* of the order of 8.2M ohms, and correspondingly, the control grid of the last mentioned valve is connected to the anode of the valve 34*a* through another high-resistive resistor of the order of 8.2M ohms. The last mentioned connections have the effect, that the halves 34*a* and 34*b*** together are forming a bistable toggle circuit, the operation of which will be described later.

In each channel the zero voltage end of the secondary winding 4 of the input transformer 1 is connected to a common conductor 37, to which also the zero voltage end of each potentiometer 8 is connected. The conductor 37 is connected to the wiper of a potentiometer 38, which is connected in parallel with a resistor 40 of the order of 100 ohms. An electrolytic capacitor 39 of the order of 100 $\mu$f. is connected between the conductor 37 and ground.

The resistor 40 is connected between the point P and ground. As the cathodes of the valves are connected to ground and the point P potential is connected to the minus pole of the current supply rectifier 41, the anode current of the valves will pass through the resistor 40. Therefore, the point P will become negative relative to ground with about 8 volts.

The valve 34*b* in one of the channels has a fixed anode resistor 42*b*. The valve 34*a* in the other of the channels has a variable anode resistor 42*a*, which can be adjusted to substantially the same value as the fixed resistor 42*b*. It is important for the proper function of the toggle circuit that the anode resistors of the valves 34*a* and 34*b* have the same value, although it may be desirable on certain occasions, for example when one of the microphones is located in a very noisy place, to adjust these resistors to slightly different values, for suppressing the sensitivity of one of the channels to a certain degree.

Due to the fact, that the anode in the triode valve 34*a* is connected to the screen grid in the valve 10*b*, and, correspondingly, the anode of the valve 34*b* is connected to the screen grid of the valve 10*a*, and in consideration thereof, that the resistors 36*a* and 36*b*, connecting the anode of one of the tubes 34*a* of the toggle circuit with the control grid of the other of said tubes 34*b* and vice versa, are very high-resistive, of the order of 8 megohms, the action of the toggle circuit will be depending upon the magnitude of the screen grid current in both tubes 10*a* and 10*b*. If the screen grid current is high, it will overbalance the anode currents of the valves 34*a* and 34*b*, and the toggle circuit constituted by the valves 34*a* and 34*b* will not operate as a toggle circuit. The valves will instead adjust themselves in such way, that they have equal anode voltages and equal grid voltages.

The magnitude of the screen grid currents in the valves 10*a* and 10*b* can be adjusted by means of the potentiometer 38, which controls the grid bias voltages of said valves. This potentiometer should be adjusted to a position, that in rest condition, i.e. when no signal voltages are passing any one of the amplifier channels, the toggle circuit 34*a*, 34*b* is on the verge of being active.

It will now be assumed, that sound waves strike the microphone 3*a*, so that signal voltages appear in the uppermost amplifier channel (according to the drawing). The amplification in this channel is partly suppressed, because the screen grid voltage of the valve 10*a* equals the anode voltage of the valve 34*b* and is of rather low value, and the voltage of the second control grid of the valve 10*a* is a few volts negative with respect to the cathode of the valve.

Signal voltages will now be supplied from the anode of the valve 5*a* through a conductor 50*a*, including a resistor 52*a* of the order of 1.8 megohms and a condenser 51*a* of the order of 10,000 $\mu\mu$f., to the control grid of the valve 21*a*.

These signal voltages are amplified in the triode system and rectified in the diode systems 22*a* and 23*a*. The cathode of the diode system 22*a* then will be more positive, and, therefore, the point A belonging to the filter chain 27*a*, 28*a*, and 29*a*, will also be more positive.

Therefore, the grid voltage of the tube 34*a* will be more positive and the voltage of the second control grid of the valve 10*a* also will be more positive. This means, that the amplification in the valve 10*a* increases, whereby the signal voltage appearing at the output transformer 13*a* will be higher. Signal voltages will now be supplied to the control grid of the valve 21*a* also from the secondary winding 15*a* of the output transformer 13*a*, where they are added to the signal voltages already appearing in this point. The more the amplification increases, the more the signal voltage coming from the output transformer is asserting itself, and therefore a very rapid control process is obtained.

In order to prevent a too rapid increase of the signal voltage amplitude at the anode of the triode valve 21*a*, there is in each channel a resistor 210 of the order of 820K ohms connected between the control grid of the valve and a point, which becomes negative, when signal voltages appear in the channel. Due to the curved *Ia*/*Vg*-characteristic of the valve, it is thereby obtained, that upon increase over a certain extent of the signal voltage, the amplification in the valve is decreased.

At the same time, however, the anode voltage of the diode system 23*a* will be displaced in a negative direction, whereby also the point B in the filter chain 27*b*, 28*b*, and 29*b* will be more negative. Thereby the grid voltage of the triode valve 34*b* as well as the voltage of the second control grid of the valve 10*b* will be more negative. The amplification in the valve 10*b* is then further decreased, whereby signals which are transmitted from the loudspeaker 17*a* to the microphone 3*b* (these two transducers are assumed to be positioned close to each other) are not considerably amplified in the lowermost channel according to the drawing, and accordingly, these signals are not at all or only weakly reproduced by the loudspeaker 17*b*.

The amplification control is further improved due to the fact that when the control grid in the valve 34*a* becomes more positive, the anode of said valve will be more negative. Thereby, the screen grid of the valve 10*b* will be more negative, resulting in a further decrease of the amplification in the lowermost channel according to the drawing. Correspondingly, the voltage of the anode of the valve 34*b* will be more positive when its control grid, as already stated, becomes more negative. The screen grid voltage of the tube 10*a* will then be more positive, resulting in a further increase of the amplification in the uppermost channel.

However, when the second control grid of the valve 10*a* becomes more positive, the anode current will increase, and the screen grid current will decrease. The decrease of the screen grid current is not entirely counterbalanced by the increase of the same current, which occurs because the voltage of the screen grid, as described above, becomes more positive. Correspondingly, the displacement in a negative direction of the screen grid voltage of the valve 10*b* will result in a decrease of the screen grid current, said decrease being only partly counterbalanced (with the selected points of operation) by the increase in said current, caused by the displacement in a negative direction of the voltage of the control grid of the valve 10*b*. The result of the alteration of the voltages just described will be that the total screen grid current is decreased. Thereby, conditions are established for the toggle circuit comprising the valves 34*a* and 34*b* to be operative. The toggle circuit will thereby switch itself to that one of its states of equilibrium, in which the current through the valve 34*a* is rather strong and the current through the valve 34*b* is rather weak. This means that the amplification in the valve 10*a* is further increased and the amplification in the valve 10*b* is further decreased.

The function of the toggle circuit just decribed is further speeded up, due to the fact, that the second control grid of the valve 10 in each channel is connected through the resistors 29, 33 to the control grid of the valve 34. When, for example, the control grid of the valve 34*a* becomes more positive, the second control grid of the valve 10*a* will be more positive. This results in a decrease of the screen grid current in said valve and a corresponding increase of its voltage. The screen grid of the valve 10*a* is, however, directly connected to the anode of the valve 34*b* and, consequently, also the latter will be more positive. Correspondingly, the displacement in a negative direction of the voltage of the control grid of the valve 34*b* results in a displacement in a positive direction of the voltage of the anode of the valve 34*a*.

This effect increases the speed, at which the toggle circuit becomes operative and is switched to one of its states of equilibrium.

In the arrangement according to FIG. 1, it is an essential advantage that the toggle circuit can be adjusted to a condition, in which it has a neutral state of equilibrium, and that the conditions for its being operative with two pronounced, active states of equilibrium, will be established only when signal voltages appear in one of the channels. Thereby it is possible to obtain a control process of such rapidity, that the first syllable will be reproduced, even if the amplitude of the sound waves is small and the amplification, to which the channels are adjusted, is very small in order to enable the microphone and the loudspeaker at each conversation station to be positioned very close to each other.

In the preceding description it has been assumed that signals are passing the uppermost channel of the amplifier according to the drawing. The function will be entirely analogous if the signals instead are fed to the lowermost channel, and, therefore, any special description of this case will not be necessary.

The described toggle circuit possesses the property, that its states of equilibrium to a certain extent are indefinite and dependent upon the amplitude of the signal voltage appearing in the active channel. The equilibrium states of the toggle circuit do not represent the outer limits for the values, which the currents and the voltages of the circuit can acquire in one direction or the other. This may be called, that the toggle circuit is capable of making an elastic deviation beyond the values, which are characteristic for the two equilibrium positions. Such a deviation can take place under the influence of the control voltages, which are produced by the amplifier during operation. Due to this deviation, the active channel will become still more open and the other channel still more closed.

This elasticity of the toggle circuit in its equilibrium positions depends thereon, that the anode of the valve **34*a* and the screen grid of the valve 10*b* are fed through a common resistor 42*a*, and the anode of the valve 34*b* and the screen grid of the valve 10*a* are fed through a common resistor 42*b*. The screen grid currents are of the same order as the anode currents, and, therefore, the latter do not alone determine the voltage drop across the resistors 42*a* and 42*b***.

The arrangement according to FIG. 2 differs from the arrangement according to FIG. 1 in the following respects:

Each of the high-resistive resistors **36*a* and 36*b*, which connect the control grid of the valve 34*a* with the anode of the valve 34*b* and the control grid of the valve 34*b* with the anode of the valve 34*a*, respectively, is connected in parallel with a capacitor 48*a* and 48*b*** respectively.

This capacitor is of the order of 0.1 $\mu$f. The effect of this circuit is, that the toggle circuit, when no control voltages are supplied to it, will have the function of an oscillating multivibrator, if the screen grid current of the valves **10*a* and 10*b*** is not too strong. The frequency of the oscillations of said multivibrator should preferably be very low, say between 2 and 10 cycles per second.

By means of the potentiometer 38, the grid bias voltage of the tubes **10*a* and 10*b* is adjusted to a value, at which the screen grid current of these valves is not capable of preventing the oscillations of the toggle circuit. When the toggle circuit oscillates at its low frequency the channels of the amplifier will be opened and closed alternatingly. If, for example, signal voltages are fed to the uppermost channel (according to the drawing), the grid voltage of the valve 34*a* will be displaced in a positive direction, which has been described in connection with FIG. 1. The toggle circuit 34*a* and 34*b*** thereby will be locked in that state of equilibrium, in which the uppermost channel is held open and the lowermost channel is closed. The toggle circuit will remain in this position, as long as signals appear in the channel. When the signals cease, the toggle circuit starts oscillating again at its low frequency. If signals now should appear in the other channel, the toggle circuit will be locked in that position, in which said other channel is open and the first mentioned channel is closed.

A capacitor 49 of the order of 0.1 microfarad is connected between the anode of the valve **34*a* and the anode in the valve 34*b***, for the purpose to obtain a more rounded waveform of the low frequency oscillations, so that the opening and the closing of the channels in time with the oscillations of the toggle circuit will not be audible as thumps or bumps from the loudspeaker of the device.

Figure 2:
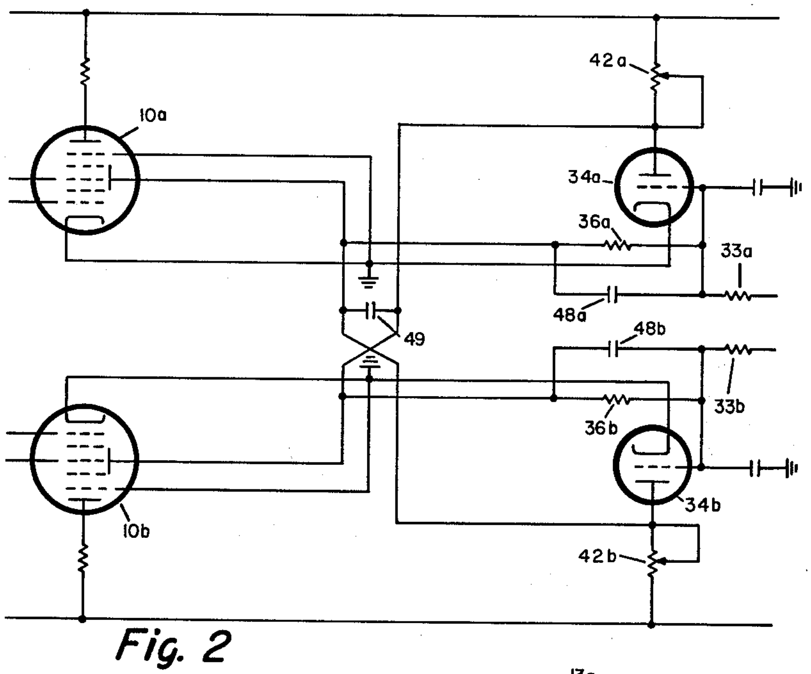

With the arrangement according to FIG. 2, the microphone and the loudspeaker at each station can be brought very close together, because the two amplifier channels are never open at the same time. By properly selecting the frequency of the toggle circuit, for example 3 cycles per second, it is obtained, that the first syllable in a word will not be lost, and further, that the self-oscillation will not be audible as a tone, because the frequency is below the limit of audibility.

Figure 3:
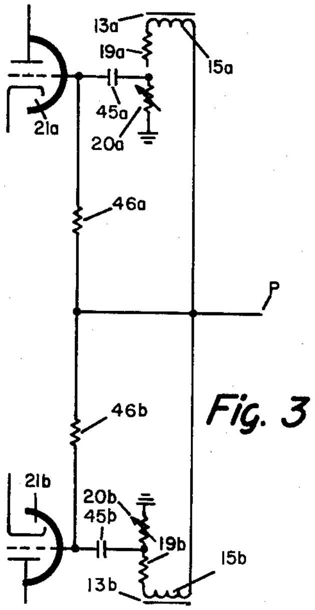

In the embodiment of the invention according to FIG. 3, the signal voltage derived from the secondary winding 16 of the output transformer 13 is supplied to one end of a voltage divider, comprising two resistors 19 and 20. The other end of said voltage divider is connected to ground. The resistor 19 is preferably fixed and of the order of 4.7K ohms, while the resistor 20 is a varistor, the resistance of which varies with the voltage across the resistor. From the joint between the resistors 19 and 20 a signal voltage is derived which is supplied to the control grid of the valve 21.

The varistor 20 serves the purpose of stabilizing the signal voltage which is supplied to the control grid of the valve 21.

For the same purpose, the grid leak 46 (FIG. 3) of the valve 21 may be of high resistance, of the order of 10M ohms, and the capacitor 45 in series with the grid may be rather great, of the order of 10,000 $\mu$f. The result of this circuit will be that a rectification of the signal voltage takes place at the grid, when said signal voltage is sufficiently high. The control grid thereby will become more negative and the anode current through the valve will decrease, whereby its cathode, which is connected to the point P through the resistor 25 (FIG. 1) will be more negative. The cathode of the triode system of the valve 21 is, however, connected to the cathode of the diode system 23. When the cathode of this diode system is displaced in a negative direction, also the anode of said system will be more negative. If, for example, signals are passing the uppermost channel (according to the drawing), the displacement in a negative direction of the voltage of the point B in the filter chain **27*b*, 28*b*, and 29*b***, therefore, will be increased.

Figure 4:
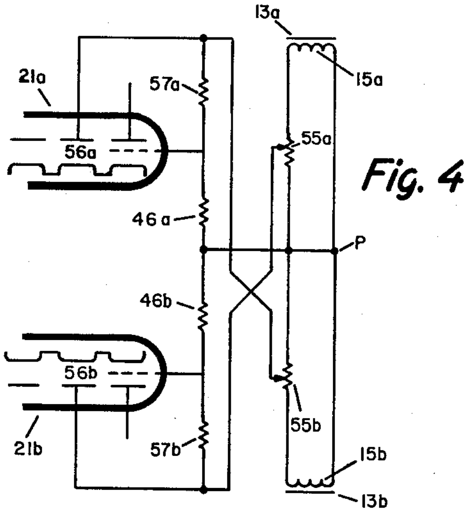

FIG. 4 illustrates a detail of another embodiment of the invention. Also in this embodiment the output transformer **13*a*, 13*b* in each channel has secondary windings 15*a*, 15*b*, respectively. In each channel one end of this secondary winding is connected to the point P with fixed potential, and the other end to a potentiometer 55*a*, 55*b*, respectively. From the wiper of the potentiometer 55*a* in one channel, a signal voltage is derived and supplied to the anode of a diode system 56*b*, belonging to the other channel. Said diode system is arranged in the valve 21*b***.

Correspondingly, a signal voltage is derived from the potentiometer **55*b* and supplied to the anode of the diode system 56*a* in the valve 21*a*, belonging to the uppermost channel. If, for example the upper channel is active, the signal voltages from the potentiometer 55*a* is supplied to the diode system 56*b*, the anode of which will become more negative, due to the voltage drop over the potentiometer resistance 55*a*. This displacement in a negative direction is transmitted to the control grid of the triode valve 21*b* through a resistor 57*b*** of the order of 500,000 ohms. This alteration of the voltage of the control grid of the tube 21*b* leads to, however, that this tube may not be able to take over the control function unless it is supplied with signal voltages of an amplitude, which is considerably higher than otherwise would have been necessary. With this arrangement, the microphone and the loudspeaker at the conversation stations can be positioned closer to each other than otherwise would have been possible. Even if rather strong sound waves from the loudspeaker of the active channel strike the microphone of the inactive channel, they will not be able to produce signal voltages at the control grid of the valve 21, which are sufficiently strong to bring the toggle circuit to switch over.

By a duplex amplifier according to the invention, much smaller time constants can be used than by duplex amplifiers of conventional types. The control process is such, that no discipline of talk is necessary. The first syllable of the first word will not be cut away and the speech will be produced at each station perfectly and undistorted.

In the preceding description, only those components have been described, which are of importance for the understanding of the invention. The function of the rest of the components appearing on the diagram, will be self-evident to anyone skilled in the art.

Although the invention now has been described with reference to some definite embodiments of the same, a plurality of variations can be made without departing from the scope of the invention, as set out in the claims. Thus, it may be possible to replace one or more valves of the amplifier by transistors, which may be connected to perform the described functions.

I claim:

1. In an amplifier for transmission of speech in two directions, the combination comprising two identical amplifier channels, voice operated control means for keeping selectively one of said channels open and the other closed, said control means comprising one controlled amplifier stage in each channel, said controlled amplifier stage comprising a screen grid tube, a toggle circuit comprising two electronic valves each having an emitting electrode, a control electrode and an output electrode, means for connecting the output electrode of each electronic valve to the control electrode of the other, said means comprising a first resistance of high value, means for connecting the output electrode of each of said electronic valves to the screen grid of different ones of said screen grid tubes, means for generating control signal voltages in response to speech signal voltages derived from two differently located points of each channel, one of said points being located before and the other one after said controlled amplifier stage, and means for supplying said control signal voltages to the control electrodes of said electronic valves, each of said means comprising a second resistance of a considerably lower value than said first resistance.

2. An amplifier according to claim 1, comprising means for deriving at least twenty-five percent of the speech signal voltage required for producing said control voltage from the one of said points, which is located before said control amplifier stage.

3. An amplifier according to claim 1, comprising means for deriving not more than seventy-five percent of the speech signal voltage required for producing said control voltage from the one of said points, which is located after said controlled amplifier stage.

4. An amplifier according to claim 1, wherein the speech signal voltage derived from the point located after the controlled amplifier stage in each channel is supplied to a resistor, the resistance value of which decreases with increasing voltage.

5. In an amplifier for transmission of speech in two directions, the combination comprising two identical amplifier channels, voice operated control means for keeping selectively one of said channels open and the other closed, said control means comprising one controlled amplifier stage in each channel, said controlled amplifier stage comprising a screen grid tube, a toggle circuit comprising two electronic valves each having an emitting electrode, a control electrode and an output electrode, means for connecting the output electrode of each electronic valve to the control electrode of the other, said means comprising a first resistance of high value, means for connecting the output electrode of each of said electronic valves to the screen grid of different ones of said screen grid tubes, means for generating control signal voltages in response to speech signal voltages derived from two differently located points of each channel, one of said points being located before and the other one after said controlled amplifier stage, means for supplying said control signal voltages to the control electrodes of said electronic valves, each of said means comprising a second resistance of a considerably lower value than said first resistance, and a manually operable volume control device in each channel, the one of said points from which signal voltage is derived which is located before said controlled amplifier stage being located before said volume control device but after at least one amplifier stage.

6. In an amplifier for transmission of speech in two directions, the combination comprising two identical amplifier channels, voice operated control means for keeping selectively one of said channels open and the other closed, said control means comprising one controlled amplifier stage in each channel, said controlled amplifier stage comprising a screen grid tube, a toggle circuit comprising two electronic valves each having an emitting electrode, a control electrode and an output electrode, means for connecting the output electrode of each electronic valve to the control electrode of the other, said means comprising a first resistance of high value, means for connecting the output electrode of each of said electronic valves to the screen grid of different ones of said screen grid tubes, means for generating control signal voltages in response to speech signal voltages derived from two differently located points of each channel, one of said points being located before and the other after said controlled amplifier stage, means for supplying said control signal voltages to the control electrodes of said electronic valves, each of said means comprising a second resistance of a considerably lower value than said first resistance, a stabilizing circuit in each channel, said stabilizing circuit included in a path for supplying signal voltage from the one of said points in each channel, from which signal voltage is derived, and which is located after said controlled amplifier stage, to said control signal voltage generating means, said stabilizing circuit comprising a control voltage amplifier stage, and means for supplying a rectified control voltage to a control electrode of said control voltage amplifier stage in such a sense that the amplification in said control voltage amplifier stage is decreased when the signal voltage derived from said point located after the controlled amplifier stage is increased.

References Cited in the file of this patent

UNITED STATES PATENTS

| | | |
|---|---|---|
| 2,273,945 | Fisher | Feb. 24, 1942 |
| 2,472,211 | Herrick | June 7, 1949 |